(12) United States Patent
Ramaswamy et al.

(10) Patent No.: US 9,324,089 B2
(45) Date of Patent: Apr. 26, 2016

(54) METHODS AND APPARATUS FOR METERING MEDIA FEEDS IN A MARKET

(71) Applicant: The Nielsen Company (US), LLC, Schaumburg, IL (US)

(72) Inventors: Arun Ramaswamy, Tampa, FL (US); Douglas B. Turnbow, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/448,920

(22) Filed: Jul. 31, 2014

(65) Prior Publication Data

US 2015/0040175 A1 Feb. 5, 2015

Related U.S. Application Data

(60) Provisional application No. 61/861,286, filed on Aug. 1, 2013.

(51) Int. Cl.
| | |
|---|---|
| *H04N 7/173* | (2011.01) |
| *G06Q 30/02* | (2012.01) |
| *H04N 21/2368* | (2011.01) |
| *H04N 21/2383* | (2011.01) |
| *H04N 21/24* | (2011.01) |
| *H04N 21/2543* | (2011.01) |

(52) U.S. Cl.
CPC ....... *G06Q 30/0201* (2013.01); *H04N 21/2368* (2013.01); *H04N 21/2383* (2013.01); *H04N 21/2407* (2013.01); *H04N 21/25435* (2013.01)

(58) Field of Classification Search
None
See application file for complete search history.

(56) References Cited

U.S. PATENT DOCUMENTS

| | | | |
|---|---|---|---|
| 4,025,851 A | 5/1977 | Haselwood et al. | |
| 4,170,782 A | 10/1979 | Miller | |
| 5,023,707 A * | 6/1991 | Briggs | 386/204 |
| 6,098,048 A | 8/2000 | Dashefsky et al. | |
| 6,295,092 B1 | 9/2001 | Hullinger et al. | |
| 6,477,579 B1 | 11/2002 | Kunkel et al. | |
| 6,545,596 B1 | 4/2003 | Moon | |
| 6,799,199 B1 | 9/2004 | Segal et al. | |
| 6,970,131 B2 | 11/2005 | Percy et al. | |
| 7,420,464 B2 | 9/2008 | Fitzgerald et al. | |

(Continued)

FOREIGN PATENT DOCUMENTS

WO 2006/098736 9/2006

OTHER PUBLICATIONS

United States Patent and Trademark Office, "Non-Final Office Action," issued in connection with U.S. Appl. No. 13/793,771, Jan. 20, 2015, 39 pages.

*Primary Examiner* — John Schnurr
*Assistant Examiner* — Cynthia Fogg
(74) *Attorney, Agent, or Firm* — Hanley, Flight & Zimmerman, LLC

(57) ABSTRACT

Methods and apparatus for metering media feeds in a market are disclosed. An example method includes duplicating a first audio stream in a media feed to generate a second audio stream, encoding the first audio stream with a first breakout code, encoding the second audio stream with a second breakout code different from the first breakout code, combining the first audio stream, the second audio stream, and a video stream of the media to generate an encoded transport stream, and instructing, via a processor, a media receiver to tune to the transport stream and select the second audio stream for distribution to a media presentation location on a channel associated with the second breakout code.

24 Claims, 9 Drawing Sheets

(56) References Cited

U.S. PATENT DOCUMENTS

| | | |
|---|---|---|
| 7,463,143 B2 | 12/2008 | Forr et al. |
| 7,592,908 B2 | 9/2009 | Zhang et al. |
| 7,647,604 B2* | 1/2010 | Ramaswamy ............... 725/9 |
| 7,707,600 B1 | 4/2010 | Ramanathan |
| 7,872,572 B2 | 1/2011 | Harrington et al. |
| 8,369,972 B2* | 2/2013 | Topchy et al. ............... 700/94 |
| 2002/0026635 A1* | 2/2002 | Wheeler et al. ............. 725/19 |
| 2002/0059576 A1* | 5/2002 | Feininger et al. ............. 725/1 |
| 2003/0103645 A1* | 6/2003 | Levy et al. ................. 382/100 |
| 2004/0192351 A1 | 9/2004 | Duncan |
| 2007/0124757 A1* | 5/2007 | Breen ................. H04H 60/91 |
| | | 725/18 |
| 2007/0186228 A1* | 8/2007 | Ramaswamy et al. ......... 725/14 |
| 2008/0263579 A1* | 10/2008 | Mears et al. .................. 725/9 |
| 2009/0007169 A1* | 1/2009 | Headley et al. ............... 725/14 |
| 2009/0172763 A1* | 7/2009 | Liu ................. H04L 29/06027 |
| | | 725/114 |
| 2009/0257620 A1 | 10/2009 | Hicks |
| 2009/0293093 A1* | 11/2009 | Igarashi .................... 725/115 |
| 2009/0299857 A1 | 12/2009 | Brubaker |
| 2010/0036717 A1 | 2/2010 | Trest |
| 2010/0134278 A1* | 6/2010 | Srinivasan et al. ....... 340/539.13 |
| 2010/0179878 A1 | 7/2010 | Dawson et al. |
| 2010/0223062 A1* | 9/2010 | Srinivasan et al. ........... 704/500 |
| 2011/0093330 A1 | 4/2011 | Burckart et al. |
| 2011/0093878 A1* | 4/2011 | Falcon ....................... 725/14 |
| 2013/0160042 A1* | 6/2013 | Stokes et al. ................ 725/18 |
| 2014/0250449 A1* | 9/2014 | Ramaswamy ............... 725/18 |
| 2014/0257969 A1 | 9/2014 | Topchy et al. |
| 2014/0304756 A1* | 10/2014 | Fletcher .................... 725/115 |
| 2015/0039389 A1* | 2/2015 | Besehanic et al. ........... 705/7.29 |

* cited by examiner

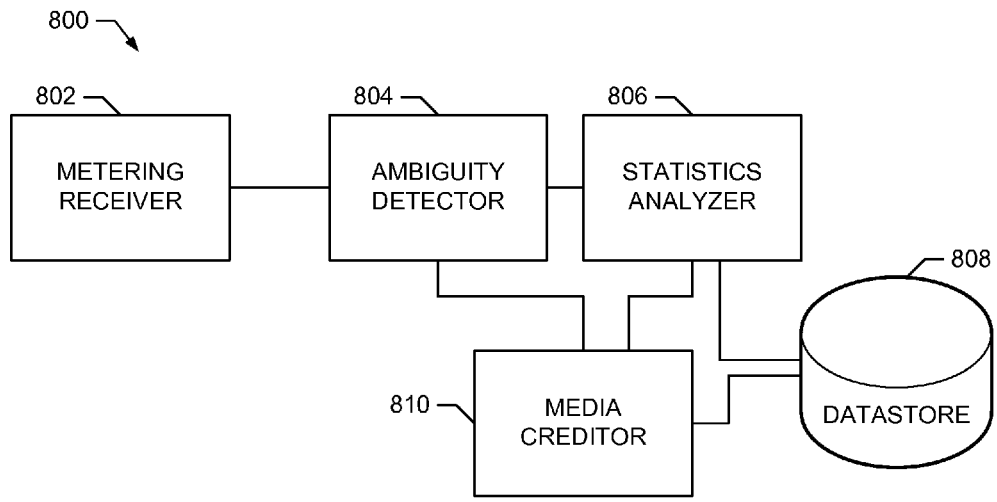
FIG. 8
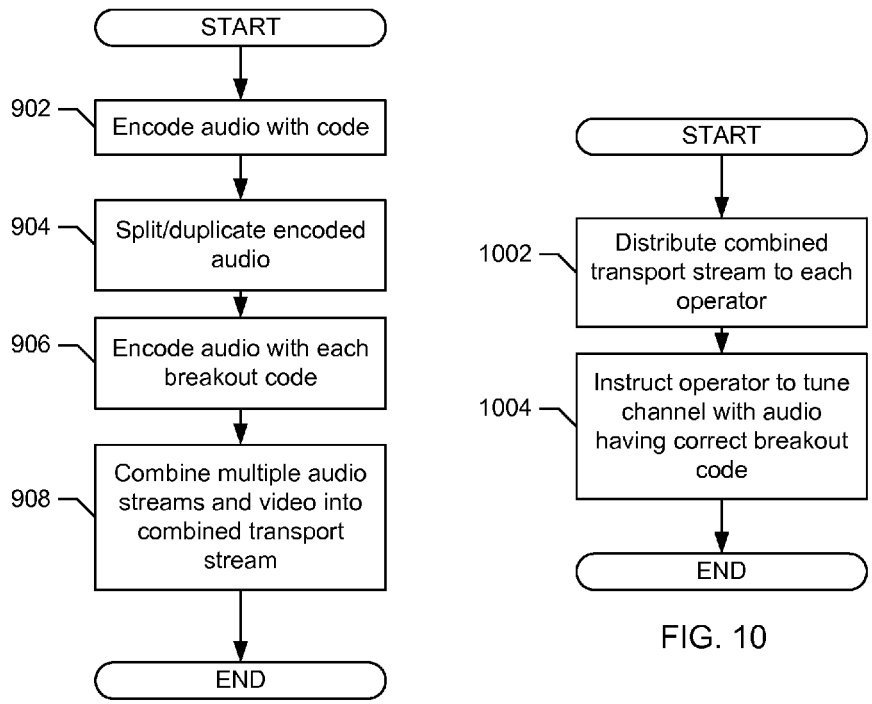
FIG. 9
FIG. 10

US 9,324,089 B2

METHODS AND APPARATUS FOR METERING MEDIA FEEDS IN A MARKET

RELATED APPLICATION

This patent claims the benefit of U.S. provisional patent application Ser. No. 61/861,286, filed Aug. 1, 2013, entitled "METHODS AND APPARATUS FOR MEDIA METERING." U.S. provisional patent application Ser. No. 61/861,286 is hereby incorporated by reference in its entirety.

FIELD OF THE DISCLOSURE

This disclosure relates generally to media metering and, more particularly, to methods and apparatus for metering media feeds in a market.

BACKGROUND

Media metering entities desire knowledge on how users interact with media devices such as smartphones, tablets, laptops, smart televisions, etc. In particular, media monitoring companies want to monitor media when presented at the media devices to, among other things, monitor exposure to advertisements, determine advertisement effectiveness, determine user behavior, identify purchasing behavior associated with various demographics, etc. As used herein, the term "media" includes any type of content and/or advertisement delivered via any type of distribution medium. Thus, media includes television programming or advertisements, radio programming or advertisements, movies, web sites, streaming media, etc. Media metering entities monitor the distribution of media to audiences to provide reports about what media is distributed, how the media is consumed by audiences, demographic profiles of the audiences, etc. The reports may be utilized by media distributors, advertisers, etc. Typically, large geographic areas to be metered (e.g., an entire country, an entire continent, the entire world) are divided into regions. These regions are sometimes referred to as designated market area (DMA) regions.

Some media distributors provide multiple feeds that can be distributed to any media markets as desired. For example, a media distributor (e.g., a distributor of sporting events) may distribute one or more primary feeds (e.g., regional feeds, a generic feed that can be used to provide media during blackout periods (e.g., when a local sporting event is blacked out for a particular market), etc.) and one or more alternate feeds (e.g., feeds with sporadic programming based on a number of sporting events to be distributed). A multiple system operator (MSO), cable headend, or other media redistributor (also referred to as an "operator" herein) that include systems for receiving and distributing media to media presentation locations includes several integrated receiver decoders (IRDs) or other types of receivers that are each capable of receiving any of the above mentioned feeds (e.g., primary feeds and/or alternate feeds). Typically, the particular feed to be distributed by the MSO, cable head end, etc. is controlled by a control signal sent from the media distributor. In response to the control signal, the operator tunes, selects, or otherwise receives a feed directed by the control signal and distributes the feed to media presentation locations. Distributing the feed may include associating the feed with a channel, multiplexing the feed with other feeds/channels, and distributing the multiplexed feeds to media presentation locations via a cable distribution system, a satellite distribution system, etc. Alternatively, any other techniques or systems for distributing the feeds to media presentation locations may be utilized.

A source identifier (SID) may be associated with a particular distribution feed by encoding or otherwise associating the SID with the media. For example, the SID may be encoded in the audio stream of the feed. Accordingly, the media may be identified (e.g., by hardware and/or software of a media metering entity) after distribution. For example, a panelist metering device (e.g., a metering device that meters panelists, which are users registered on panels maintained by a media metering entity) at a media consumer's location may detect the SID encoded in the audio to credit the media and/or provider. Media crediting information may be used to generate ratings and reports about the media, distributor, distribution channel, etc.

BRIEF DESCRIPTION OF THE DRAWINGS

FIG. 8 is a block diagram of an example metering data analyzer.

FIG. 9 is a flowchart representative of example machine readable instructions that may be executed to implement example multiple encoder of FIGS. 4, 5, and/or 6.

FIG. 10 is a flowchart representative of example machine readable instructions that may be executed to implement the example controller of FIG. 4.

DETAILED DESCRIPTION

When multiple feeds are provided by a media distributor, the feed distributed downstream from an IRD or other receiver (e.g., a receiver that tunes, downloads, or otherwise receives media from a satellite or other distribution system in order to redistribute the media to, for example, media presentation locations) may change due to the control of the IRD. For example, the same SID may be found on multiple different channels (e.g., when the same feed is distributed to multiple different channels) and/or the same channel may distribute content carrying multiple SIDs (e.g., when multiple feeds are distributed on the same channel (e.g., in different regions)). In some systems, switching records from a controller controlling the switching of the IRDs are utilized to determine which SID was carried on which channel downstream from the IRD. However, these switching records typically only identify a market or DMA in which a feed is distributed, even though different feeds may be distributed to different regions in the same market.

Example methods, apparatus, and articles of manufacture disclosed herein monitor media presentations at media devices to generate metering data. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Figure 1:
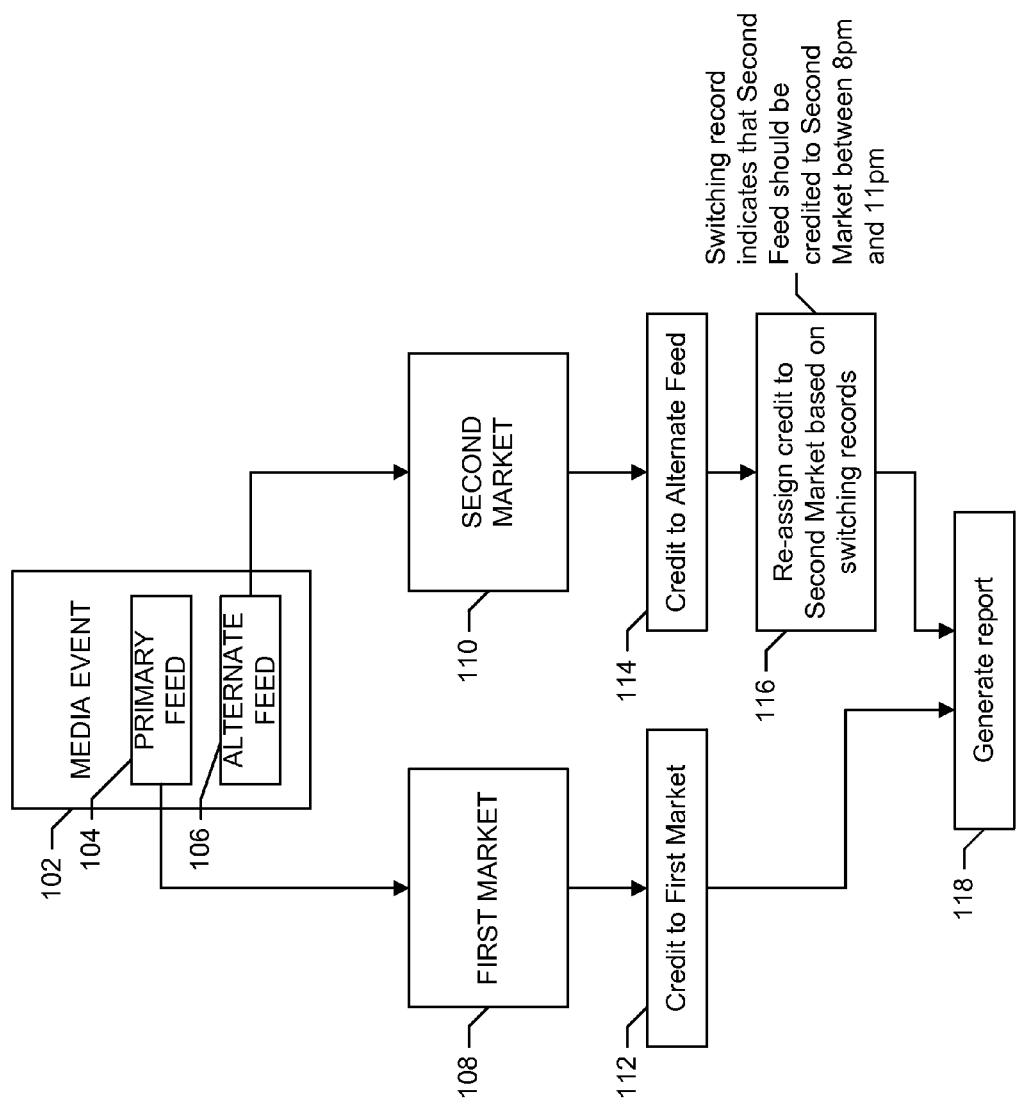
FIGS. 1-3 are block diagrams illustrating example media distribution scenarios.

FIG. 1 is a block diagram illustrating an example media distribution scenario. In the example scenario, a media event 102 includes a primary feed 104 and an alternate feed 106. According to the illustrated example, the primary feed 104 is distributed to a first market 108 (e.g., a first DMA) and the alternate feed 106 is distributed to a second market 110 (e.g., a second DMA). When metering the media, prior art panelist software in the first market 108 would, for example, capture the SID encoded in the primary feed 104. The SID in the primary feed 104 is directly associated with the primary feed 104 being broadcast or presented in the first market 108 (e.g., the SID is linked to the first market 108 in a database stored by a media metering entity). Accordingly, presentation of the primary feed 104 is correctly credited to the first market 108 at block 112.

According to the illustrated example, the alternate feed 106 includes a SID that is not directly associated with the alternate feed being selectively presented in any particular market (e.g., because the example alternate feed 106 may be distributed to multiple different markets). Accordingly, when metering the media, the presentation of the alternate feed 106 in the second market 110 is initially credited only to the alternate feed 106 at block 114. In the illustrated example, credit is re-assigned to the second market based on analyzing switching records (block 116). For example, to correctly attribute the presentation of the alternate feed 106 to the example second market 110, IRD switching records (or other records indicating the feeds or other media tuned or otherwise received by IRDs or other receivers) are analyzed to determine that the example alternate feed 106 was presented in the second market 110 (e.g., metering data may be collected at 9 pm and switching records in the collected metering data may indicate that the alternate feed 106 was distributed in the second market 110 between 8 pm and 11 pm). Finally, the credited information is analyzed to generate reports of media presentation (block 118).

In some instances, the same feed may be distributed to two different networks in the same DMA. For example, a Memphis basketball team game may be distributed on Southwest sports network in Arkansas and Sport South sports network in Tennessee and Mississippi, all of which are in the Memphis DMA. Accordingly, two switching records would be generated for this distribution and each of the two switching records would indicate the same switching time but designate different networks for crediting. This may be referred to as a one-to-many distribution. Using prior solutions, when comparing metering data to the switching records in this example one-to-many distribution, one of the two switching records would be found first and would match the feed, so the network associated with the first found switching record would be credited, even though the metering data could have been associated with a second one of the switching records. Thus, in this example, the network associated with the first switching record would be over-counted and the network associated with the second switching record would be over-counted.

Figure 2:
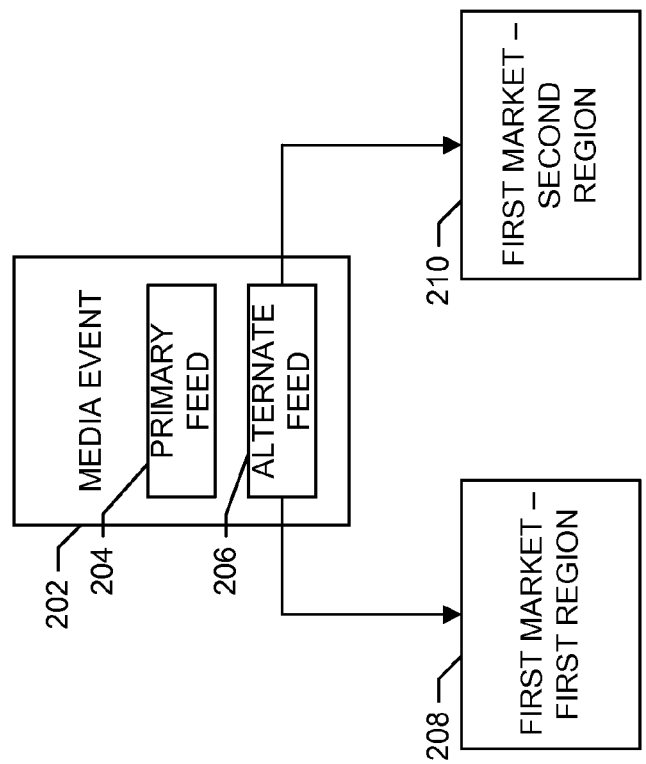

FIG. 2 is a block diagram illustrating an example media distribution scenario. In the example scenario, a media event 202 includes a primary feed 204 and an alternate feed 206. According to the illustrated example, the alternate feed 206 is distributed to a first region of a first market 208 (e.g., the Southwest network in Arkansas that is in the Memphis DMA) and the alternate feed 206 is distributed to a second region of the first market 210 (e.g., the Sports South network in Tennessee and Mississippi that is also in the Memphis DMA). According to prior processes for crediting, if the switching record for the first region of the first market 208 is first in the listing of switching records, then any media presentation of the alternate feed 206 will be credited to the first region of the first market 208 (e.g., even if the media of the alternate feed 206 was presented in the second region in the first market 210). Methods and apparatus disclosed herein facilitate proper crediting of media presentation in such one-to-many feed distribution scenarios.

In some other instances, two different feeds may be distributed to two different regions (e.g., geographical regions) in the same designated market area but on the same network. For example, a Charlotte basketball team game may be distributed on Sport South sports network in North Carolina but may be blacked out in South Carolina so an alternate feed is distributed on Sport South sports network in South Carolina. Accordingly, two switching records would be generated and the two switching records would each indicate the same networks and DMA for crediting but would designate different feeds. This may be referred to as a many-to-one distribution. When prior systems compare metering data to the switching records in this example many-to-one distribution, one of the two switching records would be found first and would match the DMA and network, so the feed identified in the first found switching record would be credited, even though the metering data could have been associated with the second feed.

Figure 3:
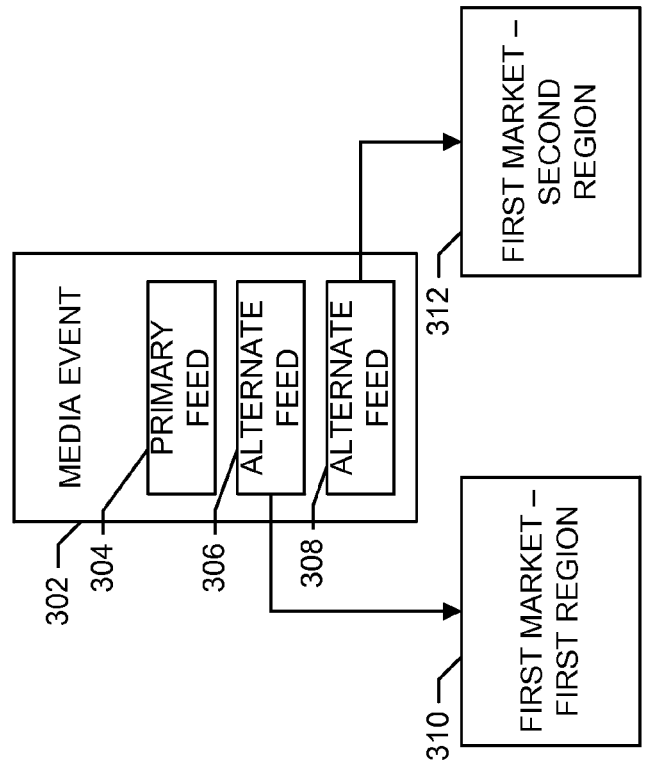

FIG. 3 is a block diagram illustrating another example media distribution scenario. In the example scenario, a media event 302 includes a primary feed 304, a first alternate feed 306, and a second alternate feed 308. According to the illustrated example, the first alternate feed 306 is distributed to a first region of a first market 310 (e.g., the Southwest network in Arkansas that is in the Memphis DMA) and the second alternate feed 308 is distributed to a second region of the first market 312 (e.g., the Sports South network in Tennessee and Mississippi that is also in the Memphis DMA). According to prior processes for crediting, if the switching record for the first region of the first market 310 is first in the listing of switching records, than the first alternate feed 306 would be credited to the first market (e.g., the first region of the first market 310 and the second region of the first market 312) while the second alternate feed 308 would receive no credit. Methods and apparatus disclosed herein facilitate proper crediting of media presentation in such many-to-one feed distribution scenarios.

Prior methods and systems for metering one-to-many distributions and many-to-one distributions such as those described in conjunction with example FIGS. 1-3 result in metering inaccuracies such as under-counting and over-counting of media presentations. In some examples, prior methods may calculate an error correction of metering data. Alternatively, the metering data may be utilized with an understanding that data includes inaccuracies.

Figure 4:
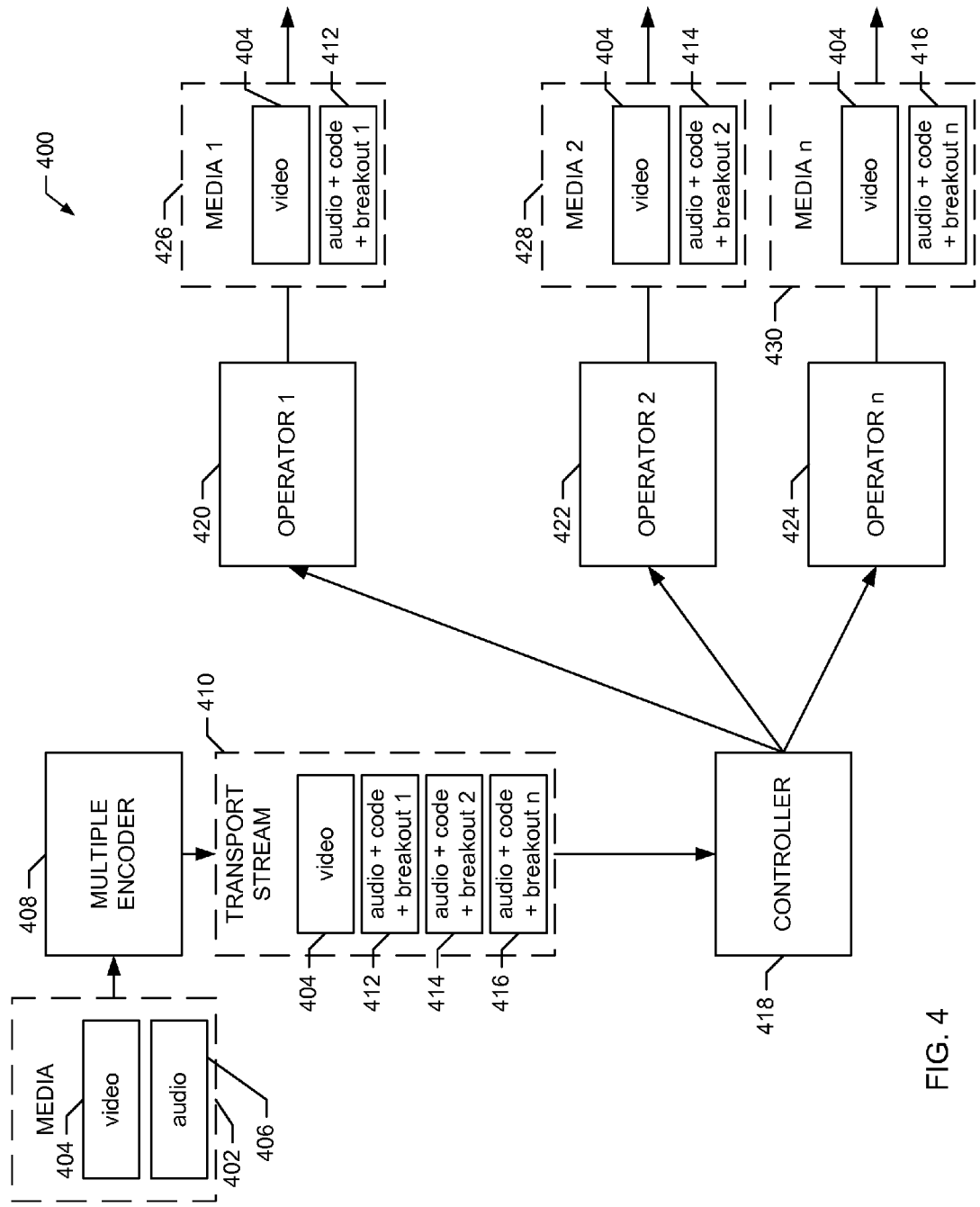
FIG. 4 is a block diagram of an example system for distributing media.

FIG. 4 is a block diagram of an example system 400 for distributing media. The example system 400 facilitates detection of media presentation in one-to-many and many-to-one distribution scenarios. According to the illustrated example, media 402 includes a video stream 404 and an audio stream 406. The example system 400 includes an example multiple encoder 408 that generates, from the example media 402, a transport stream 410 that includes the video stream 404 and multiple audio streams 412-416. The example multiple encoder 408 encodes the example audio streams 412-416 with a primary code (e.g., a code identifying the media, source of the media, distributor of the media, etc.) and a breakout code. For example, the example audio stream 412 may be encoded with a SID (primary code) that identifies the source of the media (e.g., the same SID that was used in prior systems) and a breakout code that is associated with and/or indicative of a particular region, market, network, etc. that in which the media 402 will be distributed. For example, a code/watermark that includes a primary code and a breakout code may be inserted into the audio (or other portion of the media). Thus, the example breakout code may be utilized to link the ones of the audio streams 412-416 with the distribution.

Inserting codes via audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media-identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet-identifying header). As used herein "media" refers to audio and/or visual (still or moving) content and/or advertisements. To identify watermarked media, the watermark(s) are extracted and used to access a table of reference watermarks that are mapped to media-identifying information. Example systems for identifying media based on codes are long known and were first disclosed in Thomas, U.S. Pat. No. 5,481,294, which is hereby incorporated by reference in its entirety.

An example format for a watermark that includes both the primary code and the breakout code is shown below in Table 1.

TABLE 1

Example watermark format

| SID | MODE | TYPE | DST/BRK | TIME/BREAKOUT |
|---|---|---|---|---|
| 333333 | value = 0 | (FD) | Value = 0 | 29 bits |

In the example watermark of Table 1, the field definitions are given by Table 2:

TABLE 2

Definitions for fields of the example watermark of Table 1

| | |
|---|---|
| SID | Source Identifier - 16 bit unsigned integer range 1-65535 |
| MODE | 0—Payload Carries Time Stamp<br>1—Payload Carries TIC or Breakout |
| TYPE | Program Band<br>00—PC<br>01—FD<br>10—FD2<br>Commercial Band<br>00—CC3<br>01—CC2<br>10—CC1<br>Or (when PC is not in the stream)<br>01—FD<br>10—FD2<br>11—FD3<br>*CC: Commercial Code |
| DST/BRK | If MODE bit = 0, DST/BRK indicates Daylight Saving Time (0 = Standard, 1 = DST)<br>If Mode bit = 1, DST/BRK = 1 indicates Service Breakout |
| TIME/TIC/Breakout | 29-bit integer.<br>For timestamp encoding it is the time elapsed since Jan. 1, 2010, ~17 years<br>For TIC encoding: range 1-536870912<br>If Breakout = 1, 29 bits identifies Breakout Type, Provider |

In the example watermark of Table 1, the last 29-bit field is utilized as a combined timestamp/time in creative (TIC) breakout indicator. According to the example of Tables 1 and 2, the first 5 bits (the 5 greatest bits) of the 29-bit timestamp/TIC/breakout field indicate a breakout type. In the illustrated example, if the breakout type is 1 (e.g., 00001), then the next 17 bits of the timestamp/TIC/breakout field are used to identify a service provider (e.g., a unique number may be associated with each possible service provider). The last 7 bits of the timestamp/TIC/breakout field provide a timestamp. In this example, when the breakout type is 0 (e.g., 00000), the field is only utilized to indicate a timestamp for the watermark, and the 17 bits of the service provider field are not utilized. Any other breakout types may be utilized to provide additional information about the feed and/or distribution of the feed.

According to the illustrated example, the transport stream 410 is provided to an example controller 418 that distributes the transport stream example 410 to example operators 420, 422, and 424. The example controller 418 further controls each operator to tune the appropriate one of the audio streams 412-416 included in the transport stream 410 to present the encoded media 426-430.

The operators 420, 422, and 424 of the illustrated example include systems and hardware for receiving and redistributing media to media presentation locations via any number of intermediate systems. According to the illustrated example, the operators 420, 422, and 424 are representative of the hardware components (e.g., IRDs, media transcoding hardware, multiplexing hardware, media transmission hardware, etc.) to receive media feeds that are distributed via satellite and distribute the media feeds to media presentation locations. Alternatively, any other type of distribution systems may be utilized in the methods and apparatus disclosed herein.

For example, in the illustrated example, the controller 418 instructs the first operator 420 to tune to the channel, station, etc. associated with the transport stream 410 and further instructs the first operator 420 to present the first audio stream 412 included in the example transport stream 410. Accordingly, example first media 426 is presented by the first operator 420. The example first media 426 includes the video stream 404 from the example media 402 and includes the first audio stream 412 that was generated by encoding the audio 406 located in the example transport stream 410. Thus, because the audio 412 presented by the first operator 420 includes the first breakout code (e.g., where the multiple encoder 408 and/or the controller 418 tracks the association of the first breakout code with the first operator 420), media presentations in which the first breakout code is detected can be linked back to the first operator 420 and the transport stream 410 for crediting.

According to the illustrated example, the controller 418 instructs the example second operator 422 to tune the transport stream 410 and to select the second audio stream 414 to present the second media 428. The example controller 418 may control any number of operators. For example, in the example of FIG. 4, the nth operator 424 is instructed to tune the example transport stream 410 and to use the nth audio stream 416 to present nth media 430.

While the foregoing example and other examples disclosed herein describe encoding the audio, the code and/or the breakout code may be transmitted in any other manner. For example, one or more video streams may be encoded, one or more metadata streams may carry the codes and/or breakout codes, etc. Additionally, while the examples describe that the same video stream (e.g., the video stream 404) is included in the media (e.g., the media 402), the transport stream (e.g., the transport stream 410), and the presented media (e.g., the media 426-430), the video may be modified during the distribution such that the presented media is not identical to the original media. For example, the video stream may be encoded, may be transcoded, etc. Some or all of the functionality of the multiple encoder 408 and the controller 418 may be combined into a single component (e.g., the multiple encoder 408 may include the controller 418). For example, the multiple encoder 408 may perform the encoding and may control the example operators 420-424.

Figure 5:
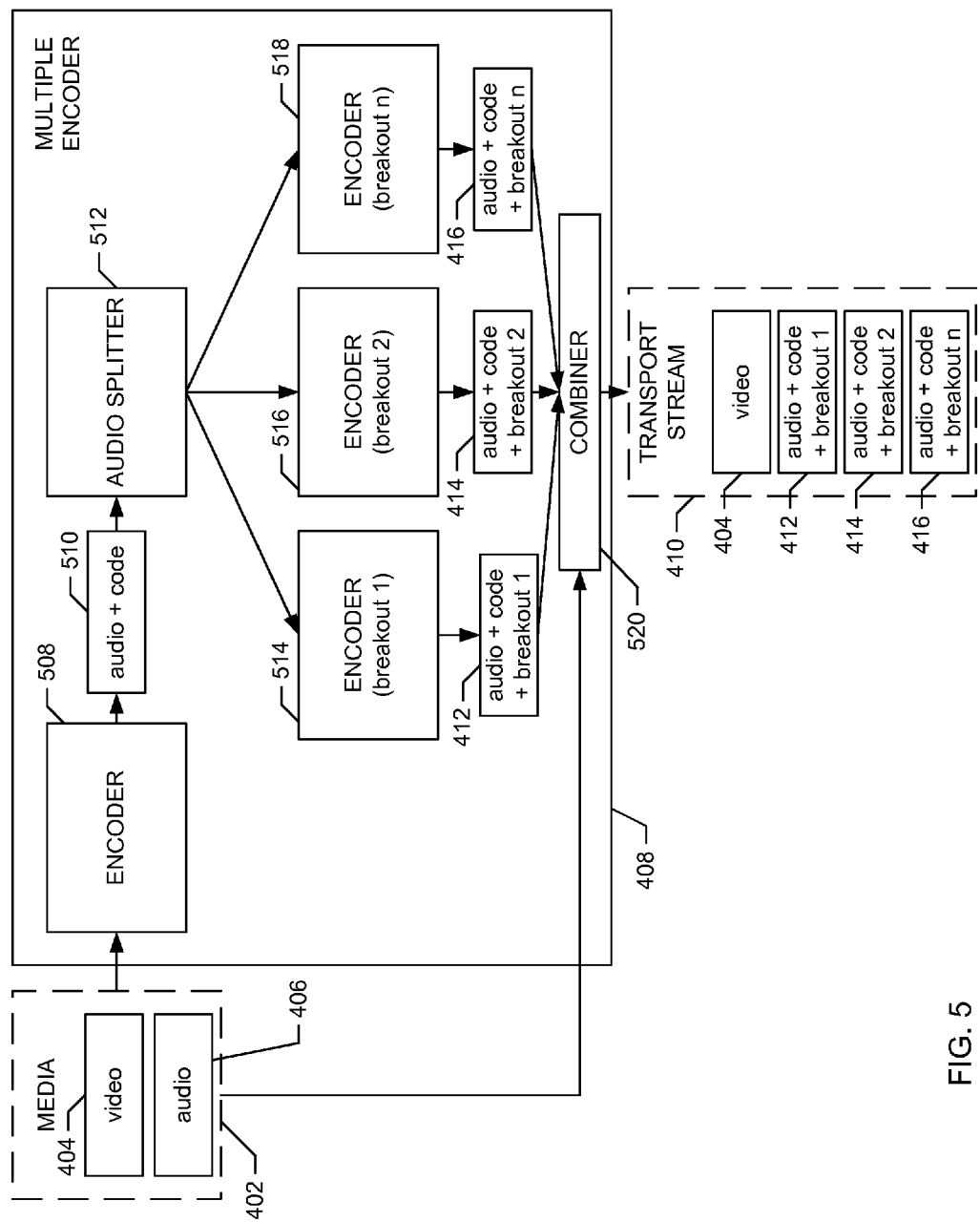
FIG. 5 is a block diagram illustrating an example implementation of the multiple encoder of FIG. 4.

FIG. 5 is a block diagram illustrating an example implementation of the multiple encoder 408 of FIG. 4. The example multiple encoder 408 of FIG. 5 includes an example first encoder 508, an example audio splitter 512, a set of example encoders 514-518, and an example combiner 520.

The example first encoder 508 receives the media 402 and encodes the audio stream 406 with a code to generate the example encoded audio 510. According to the illustrated example, the code is inserted into the audio stream 406 as a watermark. Alternatively, any other encoding technique may be utilized.

The example audio splitter 512 of FIG. 5 generates multiple copies of the example encoded audio 510. For example, the audio splitter 512 may generate one copy of the encoded audio 510 for each of different networks, regions, markets, etc. in which the example media 402 is to be distributed. For example, the audio splitter 512 may generate a copy of the encoded audio 510 for each of the existing networks in a DMA to provide flexibility to decide at a later time which network(s) should distribute the media. Alternatively, the audio splitter 512 may generate a smaller number of copies of the encoded audio 510 where it is known which and/or how many networks, regions, etc. will distribute the example media 402.

The set of encoders 514-518 of the illustrated example include an encoder for each of the copies of the encoded audio 510 generated by the example audio splitter 512. The encoders in the set of example encoders 514-518 encode a breakout code in each of the copies of the encoded audio 510 to generate the audio streams 412-416.

The combiner 520 of the illustrated example combines the example video stream 404 with the audio streams 412-416 to generate the example transport stream 410.

In some examples, the multiple encoder 408 of FIG. 5 may include the controller 418 of FIG. 4.

While the example illustrated in FIG. 5 includes a first encoder 508 to insert the code and the set of encoders 514-518 to insert the breakout code, the multiple encoder 408 may alternatively not include the first encoder 508 where the set of encoders 514-518 inserts both the code and the breakout code in copies of the audio stream 406 generated by the audio splitter 512.

Figure 6:
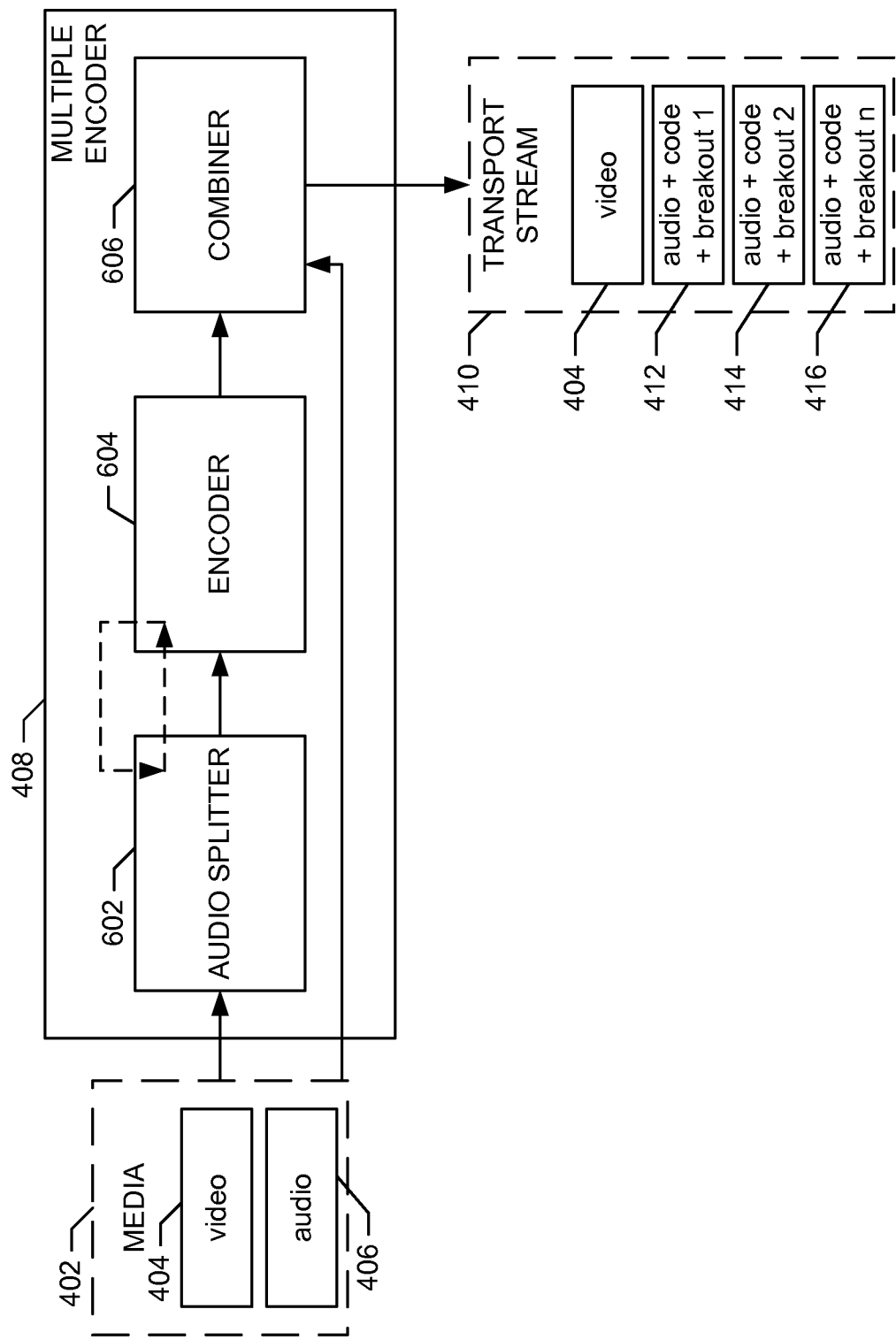
FIG. 6 is a block diagram illustrating an example implementation of the multiple encoder of FIG. 4.

FIG. 6 is a block diagram of another example implementation of the multiple encoder 408. The example encoder 408 of FIG. 6 includes an audio splitter 602, an example encoder 604, and an example combiner 606.

The example audio splitter 602 makes a copy of the audio stream 406 for processing by the example encoder 604.

The example encoder 604 inserts a code and a breakout code into the copy of the audio stream 406. For example, the example encoder 604 watermarks the audio. Alternatively, any other encoding technique may be utilized.

The example audio splitter 602 and the encoder 604 cooperate to loop through the copying and encoding to generate any number of desired copies of the audio stream 406. For example, the audio splitter 602 and the encoder 604 may loop to generate audio streams for each network, region, etc. that exists and/or in which the example media 402 is expected to be distributed.

The combiner 606 of the illustrated example combines the example video stream 404 with the encoded audio streams from the encoder 604 to generate the example transport stream 410.

In some examples, the multiple encoder 408 of FIG. 6 may include the controller 418 of FIG. 4.

Figure 7:
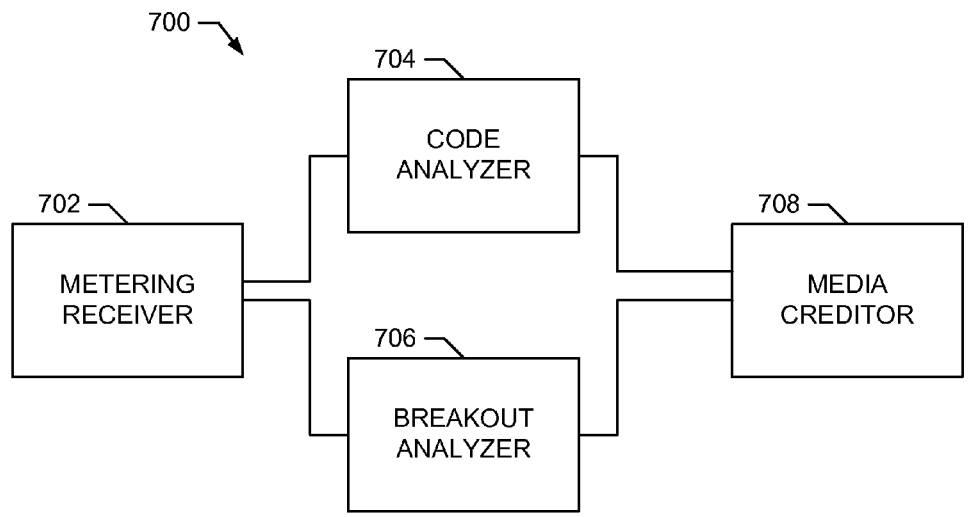
FIG. 7 is a block diagram of an example metering analysis system to analyze metering data from a media distribution in accordance with the examples disclosed herein.

FIG. 7 is a block diagram of an example metering analysis system 700 to analyze metering data from a media distribution according to examples disclosed herein (e.g., disclosed in conjunction with FIGS. 4-6). The example metering analysis system 700 may be located at, for example, a data collection facility of a metering entity (e.g., The Nielsen Company (US), LLC). The example metering analysis system 700 includes an example metering receiver 702, an example code analyzer 704, an example breakout analyzer 706, and an example media creditor 708.

The example metering receiver 702 receives metering data from metering devices (e.g., metering devices at media presentation locations). According to the illustrated example, the metering receiver 702 receives metering data from panelist locations that include metering devices and/or metering software that collects codes and/or signatures from media as the media is received and/or presented at the panelist locations. Alternatively, the example metering receiver 702 may receive any other type of metering data including other types of panelist data, census data, surveys, panelist logbooks, etc.

The example code analyzer 704 extracts codes from the metering data received by the example metering receiver 702. According to the illustrated example, the codes in the metering data have already been extracted by the metering devices and are included in metering data. The example code analyzer 704 retrieves the codes from the metering data and compares them to reference code information (e.g., a database of codes) to determine the identity of the media associated with the codes.

For example, in the database of codes, a particular code may be associated with a sporting event that was presented in a particular DMA. Thus, when the particular code is received in the metering data, the example code analyzer 704 will query the database using the code to determine that the sporting event was presented in the DMA at the presentation location associated with the analyzed metering data. Additionally or alternatively, the code analyzer 704 may extract codes from media. For example, the metering data may include a portion of the presented media from which the code analyzer 704 may extract the codes before querying the database of codes.

While the example code analyzer 704 of FIG. 7 extracts and/or analyzes codes associated with audio (e.g., the codes inserted by the multiple encoder 408), the code analyzer 704 may alternatively extract and/or analyze codes from video, metadata, etc.

The example code analyzer 704 sends the identification of the media and/or other details (e.g., an identification of the presentation location associated with the metering data, a timestamp, etc.) to the media creditor 708.

The example breakout analyzer 706 extracts breakout codes from the metering data received by the example metering receiver 702. According to the illustrated example, the breakout codes in the metering data have already been extracted by the metering devices and are included in metering data. According to the illustrated example, the breakout code is included in a field (e.g., a grouping of bits) in the code analyzed by the code analyzer 704. The example breakout analyzer 706 retrieves the breakout codes from the metering data (e.g., from the code) and compares the breakout codes to a database of breakout codes to determine the identity of the media associated with the breakout codes.

For example, in the database of breakout codes, a particular breakout code may be associated with a sporting event that was presented in a particular region, on a particular network, or any other portion of a DMA, a market, or other grouping (e.g., the Southwest network in Arkansas that is in the Memphis DMA, the Sports South network in Tennessee and Mississippi that is also in the Memphis DMA, etc.). Thus, when the particular breakout code is received in the metering data, the example breakout analyzer 706 will query the database using the breakout code to determine that the sporting event was presented in the particular region, on the particular network, or other portion of the DMA, market, or other grouping at the presentation location associated with the analyzed metering data. Additionally or alternatively, the breakout analyzer 706 may extract breakout codes from media. For example, the metering data may include a portion of the presented media from which the breakout analyzer 706 may extract the breakout codes before querying the database of breakout codes.

The example breakout analyzer 706 sends the identification of the media, the identification of the region, a network, etc. and/or other details (e.g., an identification of the presentation location associated with the metering data, a timestamp, etc.) to the media creditor 708.

While the example breakout code analyzer 706 of FIG. 7 extracts and/or analyzes breakout codes associated with audio (e.g., the breakout codes inserted by the multiple encoder 408), the breakout analyzer 706 may alternatively extract and/or analyze codes from video, metadata, etc.

The media creditor 708 of the illustrated example receives the information sent by the example code analyzer 704 and the example breakout analyzer 706 and credits the media, network, and/or any other entity or object with the presentation of the media. For example, the media creditor may increment a count of presentations associated with the media having been presented in a particular DMA and on a particular network in a particular region of the DMA. Because the media distributed to operators (e.g., the example operators 420-424) included the multiple audio streams (e.g., the example audio streams 412-416) that included separate breakout codes and that could be selectively tuned by the operators, the multiple encoder 408 and/or the controller 418 can ensure that the proper network, region, feed, etc. is credited by selectively controlling the operators to select the appropriate audio stream for distribution and/or presentation. Accordingly, ambiguity due to one-to-many and many-to-one distribution may be resolved by the example systems disclosed in example FIGS. 4-7.

FIG. 8 is a block diagram of an example metering data analyzer 800 that may be utilized in a system as an alternative to the example system of FIGS. 4-7. Alternatively, the metering data analyzer 800 may be utilized in conjunction with the example systems of FIGS. 4-7 (e.g., when an ambiguity still exists such as, for example, when the multiple audio streams cannot and/or are not utilized (e.g., where a particular operator refuses or is not technically able to tune the individual audio streams).

The metering data analyzer 800 of FIG. 8 includes an example metering receiver 802, an example ambiguity detector 804, an example statistics analyzer 806, an example datastore 808, and an example media creditor 810.

The example metering receiver 802 receives metering data from metering devices (e.g., metering devices at media presentation locations). According to the illustrated example, the metering receiver 802 receives metering data from panelist locations that include metering devices and/or metering software that collects codes and/or signatures from media as the media is received and/or presented at the panelist locations. Alternatively, the example metering receiver 802 may receive any other type of metering data including other types of panelist data, census data, surveys, panelist logbooks, etc.

The example ambiguity detector 804 receives and/or accesses switching records from, for example, the example controller 418 of FIG. 4 and detects when a distribution ambiguity is present in the metering data received from the metering receiver 802. As used herein, a presentation is ambiguous and/or an ambiguity exists when a one-to-many or many-to-one distribution (described above) is utilized. For example, a distribution ambiguity may be detected when there are multiple switching records that overlap in time and are associated with a particular code that is identified in the metering data, when there are multiple switching records that overlap in time and are associated with a single network (e.g., a single regional sports network that is associated with multiple geographically spaced markets), when a programming guide indicates a difference in media distributed in a single DMA, when a particular program (e.g., a baseball game, a football game, or another sporting event) is known to be likely to have different feeds tuned in different markets, and/or any other indication that an ambiguity exists.

If the example ambiguity detector 804 determines that no ambiguity is present in the metering data, the ambiguity detector 804 sends the metering data to the example statistics analyzer 806 to add to a statistical model and sends the metering data to the media creditor 810 for crediting the media, a feed for the media, the market (e.g., DMA) for the presentation, the network, a region, etc.

If the example ambiguity detector 804 determines that an ambiguity is present in the metering data, the ambiguity detector 804 sends the metering data to the example media creditor 810 for crediting the media, a feed for the media, the market (e.g., DMA) for the presentation, the network, a region, etc. using the statistical model generated by the example statistics analyzer 806.

The example statistics analyzer 806 generates statistical models of presentation when no ambiguity is present in metering data. The example statistics analyzer 806 generates statistical models for individual panelists. Additionally, the example statistics analyzer 806 generates statistical models for aggregations of panelists for use when a model for an individual panelist is not available (e.g., when a panelist has recently joined a panel or a metering device has recently been installed). For example, the statistics analyzer 806 may generate statistical models for panelists in one or more of a DMA, a region, a city, a state, etc. When a panelist without a model is encountered during media crediting by the example media creditor 810, the statistical model for an aggregation to which the panelist belongs (e.g., a statistical model for a DMA in which the panelist resides) may be used as the statistical model for the panelist until sufficient data for the individual panelist is available.

The example statistics analyzer 806 generates a statistical model using data for the past month (e.g., January 2014) and applies that model to ambiguous distribution during the current month (e.g., February 2014). The example statistical model tracks the percentage of time in minutes that each channel and/or feed is watched during times when no ambiguity is present (e.g., when distribution is not one-to-many distribution or many-to-one distribution). Alternatively, any other unit of measurement for determining the distribution of viewing among multiple channels and/or feeds may be used.

The example statistics analyzer 806 stores the generated statistical model (e.g., a probability distribution) in the example datastore 808 in association with the panelist and/or group with which the statistical model is associated.

The example datastore 808 is a database that stores the statistical models generated by the example statistics analyzer 806. Alternatively, the datastore 808 may be any other type of data storage including any combination of a file or files, multiple databases, distributed data storage, etc.

The media creditor 810 of the illustrated example analyzes the metering data to credit a media presentation. When the ambiguity detector 804 determines that no ambiguity is present, the media creditor 810 extracts identifying information from the metering data and credits the media, the DMA, the network, etc. associated with the identifying information. The media creditor 810 may additionally consult a database of reference information (e.g., a database linking codes and/or signatures with information about the media and/or the distribution of the media (e.g., the DMA, region, network, etc. for distribution)).

When the example ambiguity detector 804 determines that a distribution ambiguity is present (e.g., a distribution ambiguity is present and associated with the metering data based on the time of the metering data, based on the identity of the metering data, etc.), the example media creditor 810 credits the media utilizing the statistical models stored in the example datastore 808. The example media creditor 810 queries the datastore 808 for a statistical model for the panelist corresponding to the metering data. When no statistical model is available for the particular panelist, the example media creditor 810 retrieves a statistical model that is associated with a group of which the panelist is a member (e.g., the panelist may be located in a DMA, in a region, may be associated with a demographic group for which a statistical model has been created, etc.). Utilizing the statistical model, the example media creditor 810 assigns credit for the media presentation identified in the metering data. For example, if there is an ambiguity between two networks due to one-to-many distribution ambiguity, the example media creditor 810 assigns a portion of the credit (e.g., credits a portion of the presentation minutes) to each network based on historical consumption of those networks by the panelist (or group) as indicated by the associated statistical model.

For example, if a particular channel has previously been tuned to a first feed on a first network 60% of the time and a second feed on a second network 40% of the time, the statistical model would indicate a 60%/40% distribution. Thus, the media creditor 810 of the illustrated example would credit the first channel for 60% of the presentation minutes and the second channel for 40% of the presentation minutes. An example application of historical metering data to determine allocation of ambiguous metering data is illustrated by Table 3 below.

Example Viewing Interval: Feb. 1, 2013 Feb. 28, 2013

Example Model Build Interval: Jan. 1, 2013 Jan. 31, 2013

DayCount: 30

TABLE 3

Example application of historical metering data to allocation media presentation

| | Minutes-To-Impute | Model Distribution | Expected Minutes | Imputed Minutes | Imputed Distribution | Expected-To-Actual Index |
|---|---|---|---|---|---|---|
| Total Viewing To Impute: | 77158 | | | | | |
| Viewed Both Channels: | | 65.57% | 50595 | 50983 | 66.08% | 100.7668742 |
| Viewed Target 1 Only: | | 15.33% | 11826 | 11600 | 15.03% | 98.08895654 |
| Viewed Target 2 Only: | | 19.10% | 14737 | 14575 | 18.89% | 98.90072606 |
| Target 1 Viewing: | | 43.00% | 33179 | 32443 | 42.05% | 97.78172941 |
| Target 2 Viewing: | | 57.00% | 43979 | 44715 | 57.95% | 101.673526 |

The media creditor 810 and/or another entity or component may aggregate media credit and/or generate reports based on the crediting.

While example manners of implementing the multiple encoder 408 of FIGS. 4-6, the example controller 418 of FIG. 4, the example metering analysis system 700 of FIG. 7, and the example media metering system 800 of FIG. 8 are illustrated in FIGS. 4-8, one or more of the elements, processes and/or devices illustrated in FIG. 4-8 may be combined, divided, re-arranged, omitted, eliminated and/or implemented in any other way. Further, the example multiple encoder 408, the example controller 418, the example operators 420-424 of FIG. 4, the example first encoder 508, the example audio splitter 512, the example encoders 514-518, the example combiner 520, and/or more generally the example multiple encoder 408 of FIG. 5, the example audio splitter 602, the example encoder 604, the example combiner 606, and/or more generally the example multiple encoder 408 of FIG. 6, the example metering receiver 702, the example code analyzer 704, the example breakout analyzer 706, the example media creditor 708, and/or more generally the example metering analysis system 700 of FIG. 7, the example metering receiver 802, the example ambiguity detector 804, the example statistics analyzer 806, the example datastore 808, the example media creditor 810, and/or more generally the example metering data analyzer 800 of FIG. 8 may be implemented by hardware, software, firmware and/or any combination of hardware, software and/or firmware. Thus, for example, any of the example multiple encoder 408, the example controller 418, the example operators 420-424 of FIG. 4, the example first encoder 508, the example audio splitter 512, the example encoders 514-518, the example combiner 520, and/or more generally the example multiple encoder 408 of FIG. 5, the example audio splitter 602, the example encoder 604, the example combiner 606, and/or more generally the example multiple encoder 408 of FIG. 6, the example metering receiver 702, the example code analyzer 704, the example breakout analyzer 706, the example media creditor 708, and/or more generally the example metering analysis system 700 of FIG. 7, the example metering receiver 802, the example ambiguity detector 804, the example statistics analyzer 806, the example datastore 808, the example media creditor 810, and/or more generally the example metering data analyzer 800 of FIG. 8 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, multiple encoder 408, the example controller 418, the example operators 420-424 of FIG. 4, the example first encoder 508, the example audio splitter 512, the example encoders 514-518, the example combiner 520, and/or more generally the example multiple encoder 408 of FIG. 5, the example audio splitter 602, the example encoder 604, the example combiner 606, and/or more generally the example multiple encoder 408 of FIG. 6, the example metering receiver 702, the example code analyzer 704, the example breakout analyzer 706, the example media creditor 708, and/or more generally the example metering analysis system 700 of FIG. 7, the example metering receiver 802, the example ambiguity detector 804, the example statistics analyzer 806, the example datastore 808, the example media creditor 810, and/or more generally the example metering data analyzer 800 of FIG. 8 is/are hereby expressly defined to include a tangible computer readable storage device or storage disk such as a memory, a digital versatile disk (DVD), a compact disk (CD), a Blu-ray disk, etc. storing the software and/or firmware. Further still, the example multiple encoder 408 of FIGS. 4-6, the example controller 418 of FIG. 4, the example metering analysis system 700 of FIG. 7, and/or the example media metering system 800 of FIG. 8 may include one or more elements, processes and/or devices in addition to, or instead of, those illustrated in FIGS. 4-8, and/or may include more than one of any or all of the illustrated elements, processes and devices.

Flowcharts representative of example machine readable instructions for implementing the example multiple encoder 408 of FIGS. 4-6, the example controller 418 of FIG. 4, the example metering analysis system 700 of FIG. 7, and/or the example media metering system 800 of FIG. 8 are shown in FIGS. 9-12. In the examples, the machine readable instructions comprise one or more program(s) for execution by a processor such as the processor 1312 shown in the example processor platform 1300 discussed below in connection with FIG. 13. The program(s) may be embodied in software stored on a tangible computer readable storage medium such as a CD-ROM, a floppy disk, a hard drive, a digital versatile disk (DVD), a Blu-ray disk, or a memory associated with the processor 1312, but the entire program(s) and/or parts thereof could alternatively be executed by a device other than the processor 1312 and/or embodied in firmware or dedicated hardware. Further, although the example program(s) is described with reference to the flowcharts illustrated in FIGS. 9-12, many other methods of implementing the example multiple encoder 408 of FIGS. 4-6, the example controller 418 of FIG. 4, the example metering analysis system 700 of FIG. 7, and/or the example media metering system 800 of FIG. 8 may alternatively be used. For example, the order of execution of the blocks may be changed, and/or some of the blocks described may be changed, eliminated, or combined.

As mentioned above, the example processes of FIGS. 9-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 9 begins at block 902 when the example encoder 508 of the example multiple encoder 408 of FIG. 5 encodes the audio stream 406 with a code (block 902) to generate the example audio stream 510 (FIG. 5). For example, the code may be a primary SID code associated with a feed. The example audio splitter 512 (FIG. 5) then splits and/or duplicates the example encoded audio stream 510 (block 904). The split and/or duplicated audio streams are then encoded by example encoders 514-518 with a breakout code (block 906) to generate the example audio streams 412-416 (FIGS. 4 and 5). For example, the breakout code may be associated with a specific sports network that will distribute the media to a market. The example combiner 520 (FIG. 5) of the multiple encoder 408 of FIG. 5 then combines the audio streams 412-416 with the video 404 from the media 402 to generate the example transport stream 410 (block 908). For example, the example transport stream 410 is generated to include the multiple audio streams 412-416 that may be tuned when distributed to operators, MSOs, cable headends, etc. (e.g., the example operators 420-424). The example program of FIG. 9 then ends.

While the foregoing describes an example implementation of the program of FIG. 9 in conjunction with the example multiple encoder 408 of FIG. 5, the program may also be implemented in conjunction with the example multiple encoder 408 of FIG. 6. In an example implementation for the example multiple encoder 408 of FIG. 6, the example audio splitter 602 generates a split/duplicated audio stream for each audio stream to be encoded (block 904) and the example encoder 604 then encodes the primary code and breakout code in the audio stream (block 902 and block 906). The program loops through blocks 904, 902, and 906 for each of the audio stream to be encoded. Then, once all audio streams have been encoded, the example combiner 606 combines the video 404 with the encoded audio streams 412-416 to generate example transport stream 410.

FIG. 10 is a flowchart representative of example machine readable instructions that may be executed to implement the example controller 418 of FIG. 4 to distribute the transport stream 410 generated by the example multiple encoder 408 (e.g., the multiple encoder 408 of FIGS. 4, 5, and/or 6). For example, the program of FIG. 10 may be performed following generation of the example transport stream 410 by the program of FIG. 9. The example program of FIG. 10 begins when the example controller 418 distributes the combined transport stream 410 to each of the example operators 420-424 of FIG. 4 (block 1002). For example, the transport stream 410 may be distributed by satellite, cable, etc. to operators that distribute media across a country. The example controller 418 (e.g., a controller in a control room of a media distributor) instructs the operators 420-424 to tune a selected one of the audio streams 412-416 (block 1004). For example, the example controller 418 instructs the first operator 420 to tune to the first audio stream 412 that has been encoded with a breakout code that is associated with the first operator 420 (e.g., the breakout code selected for the first audio stream 412 has been stored in a database in association with an identifier associated with the first operator 420). Accordingly, because the individual audio streams 412-416 have been encoded with an identifying code (e.g., breakout code) that can be linked with the particular network, operator, region, etc. that is distributing the media, the appropriate media and network can be credited when metering data is collected by a meter and processed at a collection facility. The example program of FIG. 10 then ends.

Figure 11:
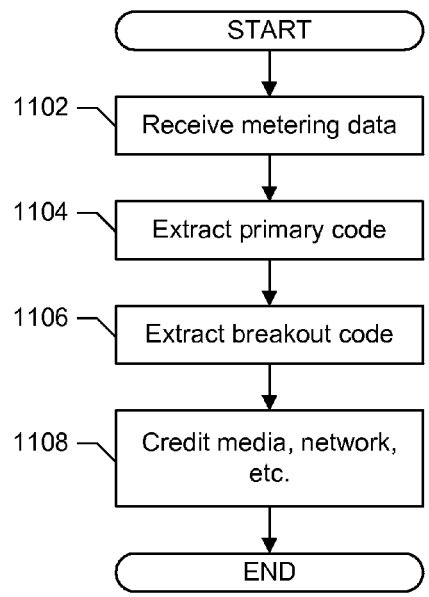
FIG. 11 is a flowchart representative of example machine readable instructions that may be executed to implement the example metering analysis system of FIG. 7.

FIG. 11 is a flowchart representative of example machine readable instructions that may be executed to implement the example metering analysis system 700 to credit a media presentation. The example program of FIG. 11 begins when the metering receiver 702 (FIG. 7) receives metering data (block 1102). For example, metering data may be received from any type of media presentation location or other location with information about media presentation (e.g., a media distributor). The example code analyzer 704 (FIG. 7) extracts a code (e.g., a primary code) from the metering data (block 1104).

The example breakout code analyzer 706 (FIG. 7) extracts a breakout code from the metering data (block 1106). The example media creditor 708 (FIG. 7) credits the media, the network, the market, etc. based on the extracted code and the extracted breakout code (block 1108). For example, the media creditor 708 may determine the network that distributed the media by comparing the breakout code to a database of breakout codes that indicates that the breakout code extracted by the example breakout analyzer 706 is associated with the network that distributed the media. The program of FIG. 11 then ends. Alternatively, the example program of FIG. 11 may then repeatedly analyze a next available record in the metering data analyzed by the example code analyzer 704 and/or the example breakout analyzer 706.

Figure 12:
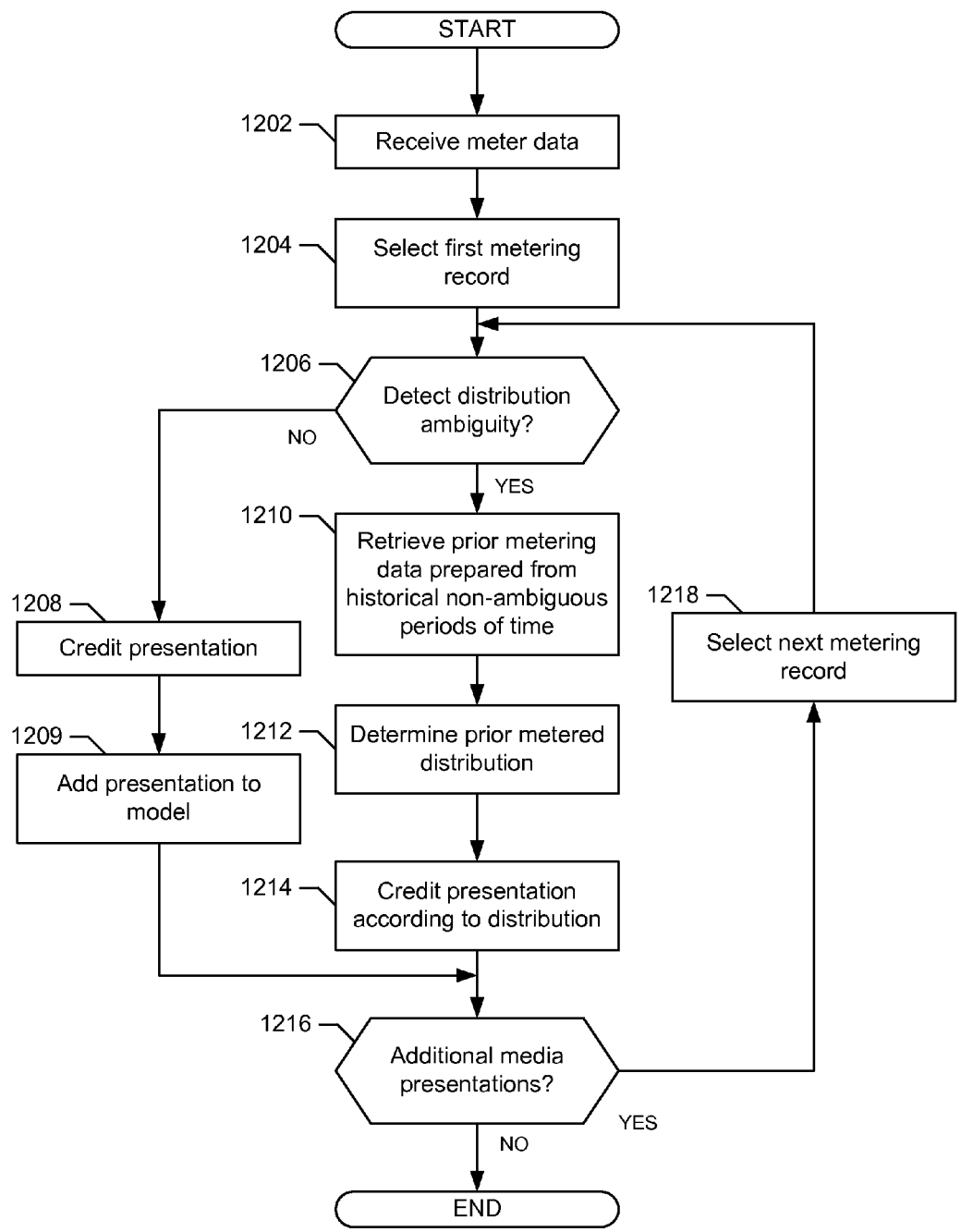
FIG. 12 is a flowchart representative of example machine readable instructions that may be executed to implement the example metering data analyzer of FIG. 8.

FIG. 12 is a flowchart representative of example machine readable instructions that may be executed to implement the example metering data analyzer 800 of FIG. 8 to accurately collect and report media presentation information. The example program of FIG. 12 may be performed in addition to or as an alternative of the programs of FIGS. 9-11. The example program of FIG. 12 utilizes historical data for networks when the presentation of media is ambiguous. In those instances, using a single SID encoded for a feed (e.g., a primary code) for metering data may not accurately indicate the network and media presented. Accordingly, the example program of FIG. 12 determines a viewing distribution (e.g., 60% viewing related to a first network distribution and 40% viewing related to a second network distribution) to proportionately allocate credit for a media presentation.

The example program of FIG. 12 begins when metering data is received by the example metering receiver 802 (e.g., at a data collection facility) (block 1202). For example, the metering data may be data collected by a panelist meter. The example metering receiver 802 selects a first metering record (e.g., a metering record associated with an instance of media presentation) (block 1204). For example, a metering record may be recorded for each uninterrupted media presentation. Then, the example ambiguity detector 804 (FIG. 8) determines if a distribution ambiguity is present (block 1206). For example, a distribution ambiguity may be detected when there are multiple switching records that overlap in time and are associated with a particular SID, when there are multiple switching records that overlap in time and are associated with a single network (e.g., a single regional sports network that is associated with multiple geographically spaced markets), when a programming guide indicates a difference in media distributed in a single DMA, when a particular program (e.g., a baseball game, a football game, or other sporting event) is known to be likely to have different feeds tuned in different markets, and/or any other indication that an ambiguity exists. If no distribution ambiguity is detected, the media creditor 810 of FIG. 8 credits the presentation of the media (block 1208) based on the identifying information for the media present in the metering data, by consulting switching records, and/or by any other process. For example, if the media presented is an alternate feed that is not particularly tied to a particular media network, the example media creditor 810 will consult switching records from the example controller 418 to determine which media network was instructed to present the media. Alternatively, if the switching record information is determined by the example ambiguity detector 804 (e.g., when determining whether multiple switching records are present for a relevant time period), the example media creditor 810 may receive the switching record and/or network identifying information from the ambiguity detector 804.

Additionally, when the example ambiguity detector 804 does not detect an ambiguity (block 1206), the example statistics analyzer 806 adds the presentation information to the statistical model for the panelist associated with the metering data (block 1209). For example, the statistics analyzer 806 may increment a count of presentations associated with the media (e.g., the feed), the network associated with the presentation, the region associated with the presentation, etc.

If the example ambiguity detector 804 detects an ambiguity (block 1206), the example media creditor 810 retrieves historical information (e.g., a statistical model) from the example datastore 808 (block 1210). For example, the metering data from the panelist, individual, and/or household associated with the metering data may be retrieved. Alternatively, if sufficient data for generating a model has not been received for the panelist, individual, and/or household associated with the metering data, information from the same market, region, etc. may be retrieved. Next, the media creditor 810 determines the distribution of a presentation from the statistical model retrieved from the datastore 808 (block 1212). For example, if a particular presentation has previously been tuned to a first feed on a first network 60% of the time and a second feed on a second network 40% of the time, the prior metered distribution would be determined to be 60%/40%. The example media creditor 810 then utilizes the determined distribution to credit the appropriate presentation(s) (block 1214). For example, in the 60%/40% example, the first channel would be credited for 60% of the presentation minutes and the second channel would be credited for 40% of the viewing minutes.

The example metering receiver 802 then determines if there are additional media presentations identified in the received metering data (block 1216). If there are additional media presentations, the example metering receiver 802 selects the next media presentation (block 1218) and control returns to block 1206 for processing. If there are no additional media presentations, the example process of FIG. 12 terminates.

Figure 13:
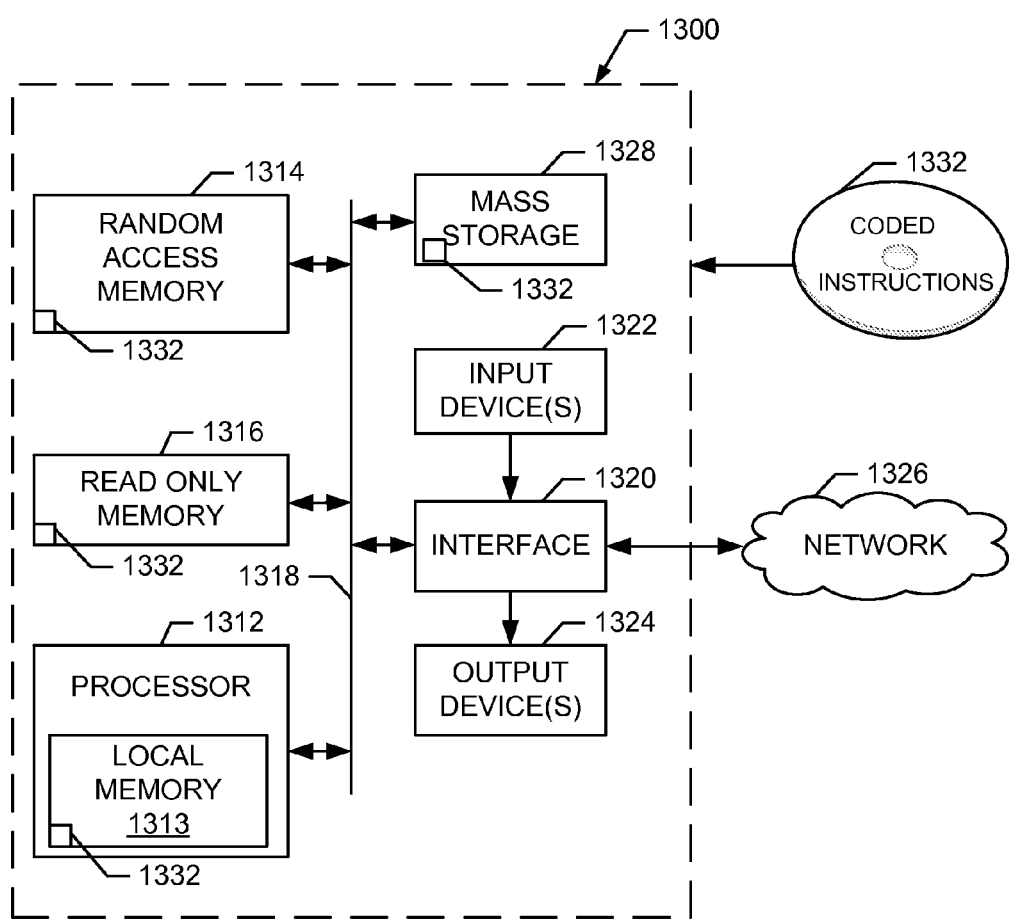
FIG. 13 is a block diagram of an example processing platform capable of executing the example machine readable instructions of FIGS. 9-12 to implement the example multiple encoder of FIGS. 4-6, the example controller of FIG. 4, the example metering analysis system of FIG. 7, and/or the example media metering system of FIG. 8.

FIG. 13 is a block diagram of an example processor platform 1300 capable of executing the instructions of FIGS. 9-12 to implement the example multiple encoder 408 of FIGS. 4-6, the example controller 418 of FIG. 4, the example metering analysis system 700 of FIG. 7, and/or the example media metering system 800 of FIG. 8. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 to implement the example machine readable instructions of FIGS. 9-12 may be stored in the mass storage device 1328, in the volatile memory 1314, in the non-volatile memory 1316, and/or on a removable tangible computer readable storage medium such as a CD or DVD.

From the foregoing, it will be appreciated that above disclosed methods, apparatus and/or articles of manufacture provide advantages over prior approaches for metering media by more accurately crediting media presentation during, for example, many-to-one and one-to-many distribution using fewer computer processing resources. For example, the example system 400 described in conjunction with FIGS. 4-7 and 9-11 facilitates accurate crediting of media presentations (e.g., media presentations associated with one-to-many and/or many-to-one distribution) without calculating an error correction of metering data thereby reducing the load on the computer processor in relation to prior approaches. As another example, the example metering data analyzer 800 described in conjunction with FIGS. 8 and 12 facilitates more accurate crediting of media presentations (e.g., media presentations associated with one-to-many and/or many-to-one distribution) by applying models developed when a media distribution ambiguity is not detected by the example metering data analyzer 800. In such examples, the models are more accurate and less computationally complex than prior techniques for estimating media presentation because a model particular to a panelist's prior behavior can be used when analyzing metering data for the panelist.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to distribute media, the method comprising:
   duplicating a first audio stream in a media feed to generate a second audio stream, the second audio stream is substantially a one-to-one replication of the first audio stream;
   encoding, with a first encoder, the first audio stream with a first breakout code;
   encoding, with the first encoder or a second encoder, the second audio stream with a second breakout code different from the first breakout code;
   combining the first audio stream, the second audio stream, and a video stream of the media to generate an encoded transport stream; and
   instructing, via a processor, a media receiver to access the transport stream and select the second audio stream for distribution to a media presentation location on a first channel associated with the second breakout code.

2. The method as defined in claim 1, further including instructing a second media receiver to access the transport stream and select the first audio stream for distribution to a second media presentation location different from the first media presentation location on a second channel associated with the first breakout code.

3. The method as defined in claim 2, wherein the first channel and the second channel are distributed in a same market.

4. The method as defined in claim 1, wherein the transport stream is a first transport stream, and wherein the first channel is associated with a local region of a network.

5. The method as defined in claim 4, further including instructing a second media receiver to access a second transport stream for distribution to a second media presentation location on a second channel in a second local region of the network, wherein the channel and the second channel are associated with a same network.

6. The method as defined in claim 1, further including metering media presentation at the media presentation location without calculating an ambiguity error correction.

7. The method as defined in claim 1, wherein the encoding of the second audio stream with the second breakout code includes inserting a watermark identifying a) a source identifier for the media and b) the breakout code associated with a network for distribution of the media.

8. The method as defined in claim 1, wherein the encoding of the second audio stream with the second breakout code includes:
   inserting a first watermark identifying a source identifier for the media; and
   inserting a second watermark identifying the breakout code associated with a network for distribution of the media.

9. An apparatus to encode media, the apparatus comprising:
   an audio splitter to duplicate a first audio stream in a media feed to generate a second audio stream, the second audio stream being substantially a one-to-one replication of the first audio stream;
   an encoder to encode the first audio stream with a first breakout code and to encode the second audio stream with a second breakout code; and
   a combiner to combine the first audio stream, the second audio stream, and a video stream of the media to generate an encoded transport stream; at least one of the audio splitter, the encoder and the combiner including hardware.

10. The apparatus as defined in claim 9, further including a controller to instruct a media receiver to tune to the transport stream and select the second audio stream for distribution to a media presentation location on a first channel associated with the second breakout code.

11. The apparatus as defined in claim 10, wherein the controller is further to instruct a second media receiver to access the transport stream and select the first audio stream for distribution to a second media presentation location on a second channel associated with the first breakout code, the second channel being different from the first channel.

12. The apparatus as defined in claim 11, wherein the first channel and the second channel are distributed in a same market.

13. The apparatus as defined in claim 10, wherein the first channel is associated with a local region of a network.

14. The apparatus as defined in claim 13, wherein the controller is further to instruct a second media receiver to access a second transport stream for distribution to a second media presentation location on a second channel in a second local region of the network, the first channel and the second channel are associated with a same network.

15. The apparatus as defined in claim 9, wherein the encoder is to encode the second audio stream with the second breakout code by inserting a watermark identifying a) a source identifier for the media and b) the second breakout code associated with a network for distribution of the media.

16. The apparatus as defined in claim 9, wherein the encoder is to encode the second audio stream with the second breakout code by:
   inserting a first watermark identifying a source identifier for the media; and
   inserting a second watermark identifying the second breakout code associated with a network for distribution of the media.

17. A tangible computer readable storage medium comprising instructions that, when executed, cause a machine to at least:
   duplicate a first audio stream in a media feed to generate a second audio stream, the second audio stream being substantially a one-to-one replication of the first audio stream;
   encode the first audio stream with a first breakout code;
   encode the second audio stream with a second breakout code different from the first breakout code;
   combine the first audio stream, the second audio stream, and a video stream of the media to generate an encoded transport stream; and
   instruct a media receiver to access the transport stream and select the second audio stream for distribution to a media presentation location on a first channel associated with the second breakout code.

18. The tangible computer readable storage medium as defined in claim 17, wherein the instructions, when executed, cause the machine to instruct a second media receiver to access the transport stream and select the first audio stream for distribution to a second media presentation location different from the first media presentation location on a second channel associated with the first breakout code.

19. The tangible computer readable storage medium as defined in claim 18, wherein the first channel and the second channel are distributed in a same market.

20. The tangible computer readable storage medium as defined in claim 17, wherein the first channel is associated with a local region of a network.

21. The tangible computer readable storage medium as defined in claim 20, wherein the instructions, when executed, cause the machine to instruct a second media receiver to access a second transport stream for distribution to a second media presentation location on a second channel in a second local region of the network, wherein the channel and the second channel are associated with a same network.

22. The tangible computer readable storage medium as defined in claim 17, wherein the instructions, when executed, cause the machine to meter media presentation at the media presentation location without calculating an ambiguity error correction.

23. The tangible computer readable storage medium as defined in claim 17, wherein the instructions, when executed, cause the machine to encode the second audio stream with the second breakout code by inserting a watermark identifying a) a source identifier for the media and b) the second breakout code associated with a network for distribution of the media.

24. The tangible computer readable storage medium as defined in claim 17, wherein the instructions, when executed, cause the machine to encode the second audio stream with the second breakout code by:
   inserting a first watermark identifying a source identifier for the media; and
   inserting a second watermark identifying the second breakout code associated with a network for distribution of the media.

* * * * *